(12) United States Patent
Iwamoto et al.

(10) Patent No.: US 11,396,162 B2
(45) Date of Patent: Jul. 26, 2022

(54) INTERMEDIATE FILM FOR LAMINATED GLASS, AND LAMINATED GLASS

(71) Applicant: SEKISUI CHEMICAL CO., LTD., Osaka (JP)

(72) Inventors: Tatsuya Iwamoto, Shiga (JP); Yuki Ishikawa, Osaka (JP); Shinji Kawada, Osaka (JP); Yuu Sakamoto, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/613,071

(22) PCT Filed: May 18, 2018

(86) PCT No.: PCT/JP2018/019314
§ 371 (c)(1),
(2) Date: Nov. 12, 2019

(87) PCT Pub. No.: WO2018/212332
PCT Pub. Date: Nov. 22, 2018

(65) Prior Publication Data
US 2020/0198301 A1    Jun. 25, 2020

(30) Foreign Application Priority Data

May 19, 2017 (JP) .............................. JP2017-099867
Jul. 24, 2017 (JP) .............................. JP2017-143120
Feb. 2, 2018 (JP) .............................. JP2018-017726

(51) Int. Cl.
*B32B 17/10* (2006.01)
*C08F 220/18* (2006.01)
(Continued)

(52) U.S. Cl.
CPC .......... *B32B 17/10605* (2013.01); *B32B 7/02* (2013.01); *B32B 17/10036* (2013.01);
(Continued)

(58) Field of Classification Search
CPC ....... B32B 7/00–7/14; B32B 17/10–17/10788; C08F 220/00–220/70;
(Continued)

(56) References Cited

U.S. PATENT DOCUMENTS 5,190,826 A      3/1993  Asahina et al.
6,093,471 A  *   7/2000  Hopfe ............... B32B 17/10577
                                                428/141
(Continued)

FOREIGN PATENT DOCUMENTS

CN           1616370 A       5/2005
CN         101331179 A      12/2008
(Continued)

OTHER PUBLICATIONS

Novotny et al. "Influence of Temperature on Laminated Glass Performances Assembled with Various Interlayers". Challenging Glass 5—Conference on Architectural and Structural Applications of Glass, Belis, Bos & Louter (Eds.), Ghent University, (Jun. 2016); pp. 1-14.*

(Continued)

*Primary Examiner* — Prashant J Khatri
(74) *Attorney, Agent, or Firm* — Cheng Law Group, PLLC

(57) ABSTRACT

Provided is an interlayer film for laminated glass capable of effectively enhancing the sound insulating property at 6300 Hz while effectively preventing deterioration in sound insulating property at 3150 Hz in laminated glass. An interlayer film for laminated glass according to the present invention has a one-layer structure or a two or more-layer structure and includes a resin layer containing a resin and a plasticizer. The interlayer film has a resonance frequency X of 550 Hz or more and 740 Hz or less, a loss factor Y in a secondary mode of 0.35 or more, and satisfies a formula: Y>0.0008X−

(Continued)

0.142 in a measurement of resonance frequency in a secondary mode in a damping test for laminated glass according to a central exciting method of laminated glass, when the laminated glass is obtained by arranging the interlayer film between two glass plates of 25 mm wide, 300 mm long and 2 mm thick.

8 Claims, 2 Drawing Sheets

(51) Int. Cl.
    *B32B 27/30*     (2006.01)
    *B32B 27/32*     (2006.01)
    *C08F 118/08*     (2006.01)
    *C08K 5/11*     (2006.01)
    *C08L 23/20*     (2006.01)
    *C08L 91/08*     (2006.01)
    *B32B 7/02*     (2019.01)

(52) U.S. Cl.
CPC ........ *B32B 17/10761* (2013.01); *B32B 27/30* (2013.01); *B32B 27/32* (2013.01); *C08F 118/08* (2013.01); *C08F 220/1802* (2020.02); *C08F 220/1807* (2020.02); *C08K 5/11* (2013.01); *C08L 23/20* (2013.01); *C08L 91/08* (2013.01); *B32B 2307/102* (2013.01); *B32B 2315/08* (2013.01); *B32B 2323/00* (2013.01); *B32B 2329/00* (2013.01)

(58) Field of Classification Search
CPC .......... C08F 10/00–10/14; C08L 23/10–23/24; Y10T 428/00–428/8305
See application file for complete search history.

(56) References Cited

U.S. PATENT DOCUMENTS

| | | | | |
|---|---|---|---|---|
| 7,619,027 | B2* | 11/2009 | Landmark | C08L 23/0815 524/490 |
| 8,900,691 | B2* | 12/2014 | Rehfeld | B32B 17/10761 428/212 |
| 9,102,122 | B2* | 8/2015 | Rehfeld | G01N 3/22 |
| 2002/0006504 | A1 | 1/2002 | Rehfeld et al. | |
| 2006/0070694 | A1 | 4/2006 | Rehfeld et al. | |
| 2007/0100060 | A1 | 5/2007 | Tahri et al. | |
| 2008/0176969 | A1 | 7/2008 | Tahri et al. | |
| 2009/0012227 | A1 | 1/2009 | Wang et al. | |
| 2009/0209670 | A1 | 8/2009 | Kanae et al. | |
| 2012/0202070 | A1 | 8/2012 | Asanuma et al. | |
| 2012/0204940 | A1 | 8/2012 | Asanuma et al. | |
| 2012/0220728 | A1 | 8/2012 | Uekusa et al. | |
| 2013/0316158 | A1* | 11/2013 | Rehfeld | B32B 17/10761 428/215 |
| 2015/0030860 | A1 | 1/2015 | Shimamoto et al. | |
| 2015/0158986 | A1 | 6/2015 | Xu et al. | |
| 2015/0239996 | A1* | 8/2015 | Funaya | C08F 10/08 526/127 |
| 2015/0258751 | A1 | 9/2015 | Shimamoto et al. | |
| 2016/0376385 | A1 | 12/2016 | Funaya et al. | |
| 2017/0028687 | A1* | 2/2017 | DeRosa | C08L 33/10 |
| 2017/0298160 | A1 | 10/2017 | Uekusa et al. | |
| 2017/0327610 | A1 | 11/2017 | Funaya et al. | |
| 2017/0327611 | A1 | 11/2017 | Funaya et al. | |
| 2017/0334173 | A1 | 11/2017 | Yui et al. | |
| 2017/0361575 | A1 | 12/2017 | Kusudou et al. | |
| 2018/0001598 | A1 | 1/2018 | Mikayama et al. | |
| 2018/0001599 | A1 | 1/2018 | Mikayama et al. | |
| 2018/0079179 | A1 | 3/2018 | Rehfeld et al. | |
| 2018/0104931 | A1 | 4/2018 | Asanuma et al. | |
| 2018/0171057 | A1 | 6/2018 | Koide et al. | |
| 2018/0290436 | A1 | 10/2018 | Yui et al. | |
| 2018/0290437 | A1 | 10/2018 | Kobayashi et al. | |
| 2018/0290439 | A1 | 10/2018 | Kusudou et al. | |
| 2019/0375196 | A1 | 12/2019 | Yui et al. | |

FOREIGN PATENT DOCUMENTS

| | | | |
|---|---|---|---|
| CN | 101341198 A | 1/2009 | |
| CN | 104662050 A | 5/2015 | |
| CN | 105960327 A | 9/2016 | |
| EP | 2 287 125 A1 | 2/2011 | |
| EP | 2 803 648 A1 | 11/2014 | |
| EP | 3 219 686 A1 | 9/2017 | |
| EP | 3 239 181 A1 | 11/2017 | |
| EP | 3 275 934 A1 | 1/2018 | |
| JP | 2007-70200 A | 3/2007 | |
| JP | 2008-208003 A | 9/2008 | |
| JP | 2015-525185 A | 9/2015 | |
| JP | 2016-107632 A | 6/2016 | |
| JP | 2016-108225 A | 6/2016 | |
| JP | 2017-502117 A | 1/2017 | |
| WO | WO-2011/016494 A1 | 2/2011 | |
| WO | WO-2011/055803 A1 | 5/2011 | |
| WO | WO-2013/105657 A1 | 7/2013 | |
| WO | WO-2014/069593 A1 | 5/2014 | |
| WO | WO-2016039471 A * | 3/2016 | ....... B32B 17/10027 |
| WO | WO-2016/076336 A1 | 5/2016 | |
| WO | WO-2016/076339 A1 | 5/2016 | |
| WO | WO-2016/076340 A1 | 5/2016 | |
| WO | WO-2016/104740 A1 | 6/2016 | |
| WO | WO-2016/158695 A1 | 10/2016 | |
| WO | WO-2016/158882 A1 | 10/2016 | |

OTHER PUBLICATIONS

Carrot et al. (eds. Olabisi et al.). "Polyvinyl Butyral", Handbook of Thermoplastics, (2015); pp. 89-137.*
Machine translation of WO2016039471. Retrieved Oct. 6, 2021.*
International Search Report for the Application No. PCT/JP2018/019314 dated Jul. 17, 2018.
Written Opinion of the International Searching Authority (PCT/ISA/237) for Application No. PCT/JP2018/019314 dated Jul. 17, 2018.
International Search Report for the Application No. PCT/JP2018/019313 dated Jul. 17, 2018.
Written Opinion of the International Searching Authority (PCT/ISA/237) for Application No. PCT/JP2018/019313 dated Jul. 17, 2018.
Written Opinion of the International Searching Authority (PCT/ISA/237) for Application No. PCT/JP2018/019314 dated Jul. 17, 2018 (English translation mailed Nov. 28, 2019).
Written Opinion of the International Searching Authority (PCT/ISA/237) for Application No. PCT/JP2018/019313 dated Jul. 17, 2018 (English Translation mailed Nov. 28, 2019).
Supplementary European Search Report for the Application No. EP 18 801 428.6 dated Feb. 2, 2021.
Supplementary European Search Report for the Application No. EP 18 801 901.2 dated Feb. 5, 2021.
Examination Report for Application No. 201947046347 from Intellectual Property India Patent Office dated Jan. 28, 2021.
Taiwanese Office Action for the Application No. 107117096 dated Feb. 24, 2021.
The First Office Action for the Application No. 201880025978.X from The State Intellectual Property Office of the People's Republic of China dated Sep. 3, 2021.
Indian Hearing Notice for the Application No. 201947046347 dated Jan. 3, 2022.
"Pharmaceutical Polymer Material Science", Chapter 7 Polymer Material for Pharmaceutical Packaging 255, Chief Editor; Zheng Junmin, China Medical Science and Technology Press, 3$^{rd}$ Edition, Jan. 2009.
The First Office Action for the Application No. 201880025954.4 from The State Intellectual Property Office of the People's Republic of China dated Oct. 22, 2021.

(56) References Cited

OTHER PUBLICATIONS

"Analysis Methods and Applications of Polymer Materials", edited by Wang Zhengxi, et al., 1st edition, Shanghai Science and Technology Press, Jan. 2009, pp. 182-185.
The Second Office Action for the Application No. 201880025954.4 from The State Intellectual Property Office of the People's Republic of China dated Apr. 24, 2022.

* cited by examiner

[FIG. 1]
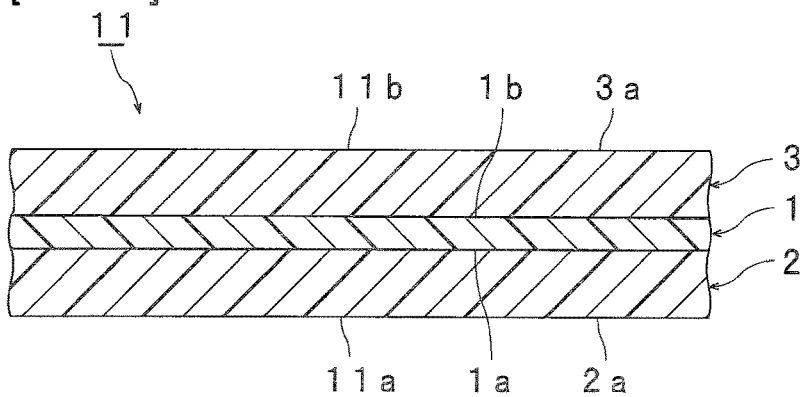
[FIG. 2]
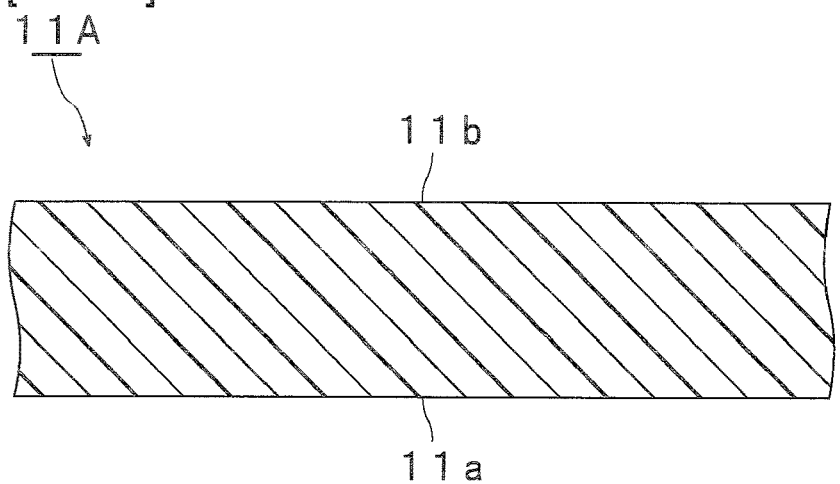
[FIG. 3]
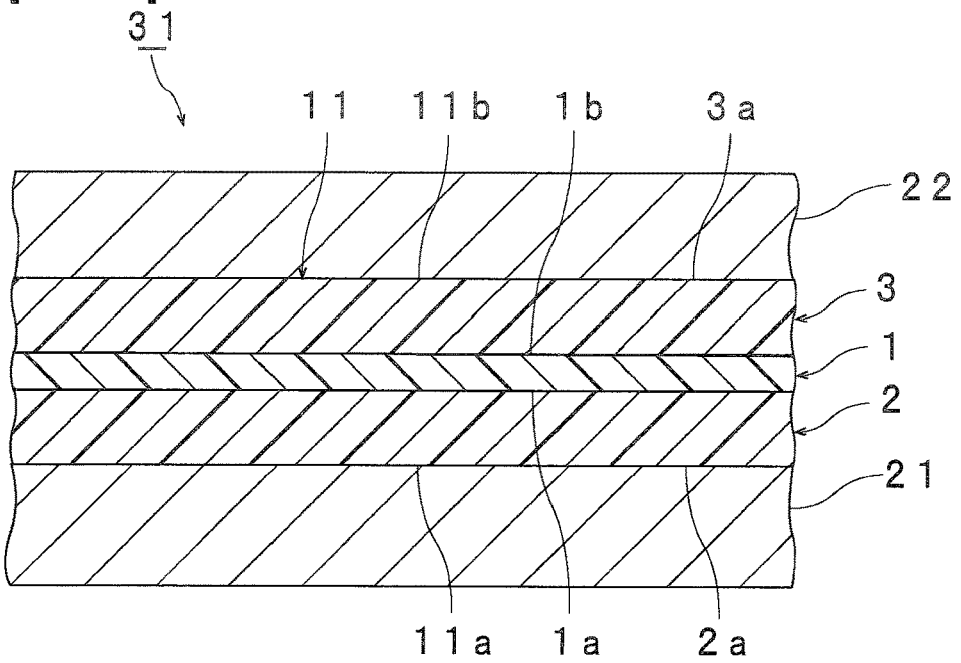

[FIG. 4.]
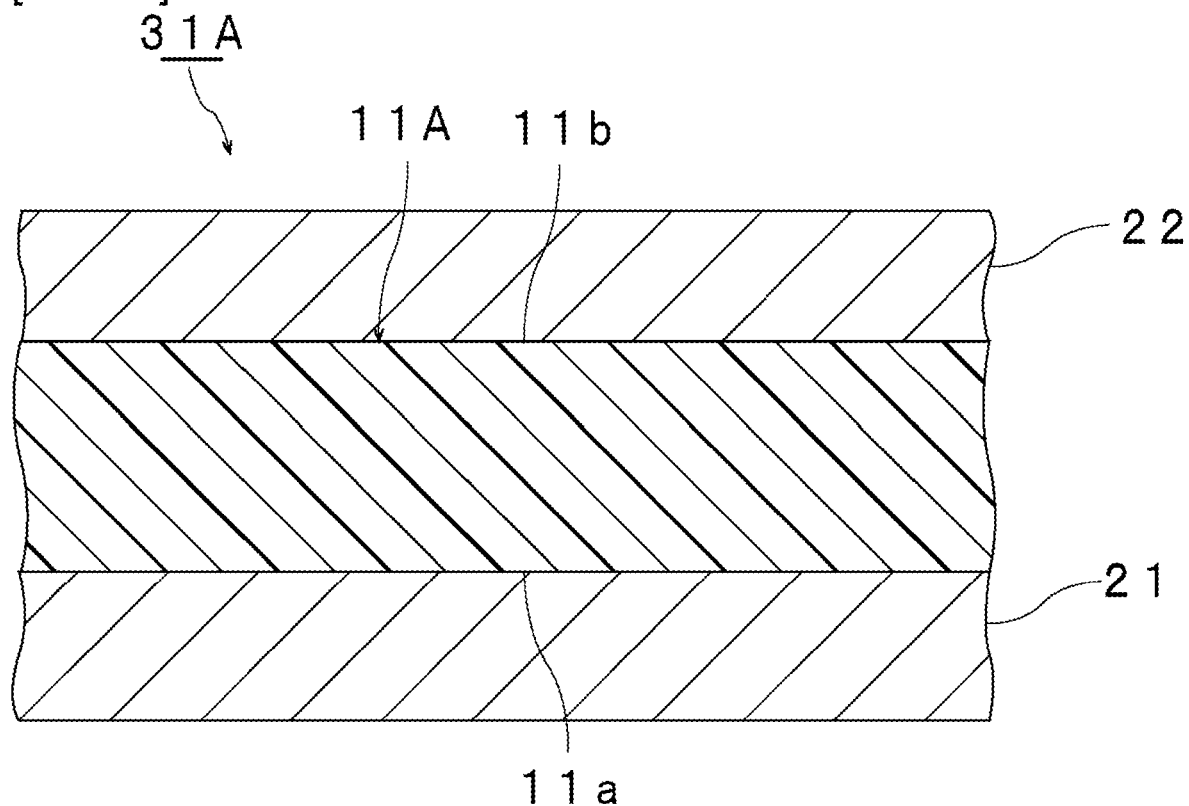
[FIG. 5.]
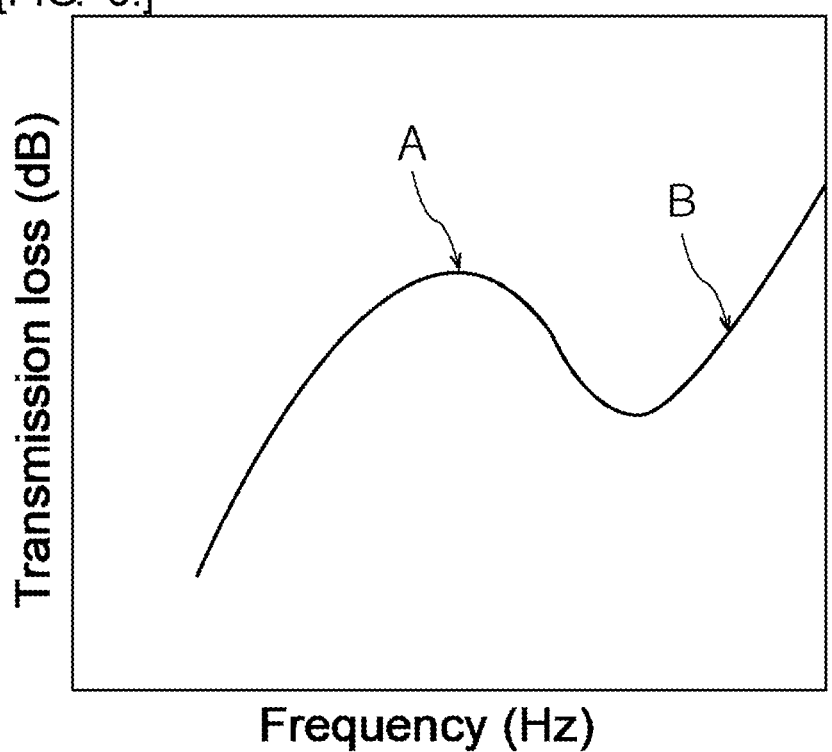

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Examples of the interlayer film for laminated glass include a single-layered interlayer film having a one-layer structure and a multi-layered interlayer film having a two or more-layer structure.

The following Patent Document 1 discloses a laminate (interlayer film) in which a sound insulating layer is located between at least two adhesive layers. Laminated glass that is prepared by pressure bonding by sandwiching the laminate between glass plates having a thickness of 2 mm, and retaining under the condition at a temperature of 140° C. and a pressure of 1 MPa for 60 minutes has the following performance. The loss factor $\alpha$ at 20° C., 2000 Hz measured by a damping test according to a central exciting method of the laminated glass is 0.2 or more. Regarding the laminated glass after retaining the laminated glass at 18° C. for 1 month, the ratio $\beta/\alpha$ of the loss factor $\beta$ at 20° C., 2000 Hz measured by a damping test according to a central exciting method, to the loss factor $\alpha$ is 0.70 or more. The sound insulating layer may contain an elastomer. The sound insulating layer does not contain a plasticizer.

Also, the following Patent Document 2 discloses an interlayer film in which a layer containing polyvinyl acetal and a layer containing polyolefin are layered.

Also, the following Patent Document 3 discloses an intermediate layer (interlayer film) arranged between two glass plates. In the interlayer film for laminated glass having the intermediate layer, the resonance frequency $f_2$ of the second resonance mode determined by measurement of mechanical impedance at 20° C. (MIM) is between 760 Hz and 1000 Hz. The loss factor $\eta_2$ of the second resonance mode determined by MIM in the same condition is 0.25 or more.

RELATED ART DOCUMENT

Patent Document

Patent Document 1: JP 2016-108225 A
Patent Document 2: WO 2011/016494 A1
Patent Document 3: JP 2015-525185 T

SUMMARY OF THE INVENTION

Problems to be Solved by the Invention

As described in Patent Documents 1, 2, an interlayer film having a layer prepared with a thermoplastic component other than a polyvinyl acetal resin is known. However, in laminated glass using this interlayer film, the sound insulating property cannot be sufficiently high.

In recent years, needs for improvement of sound insulating property are diversified in automobile fields. When the glass plate is thinned for reducing the weight, the coincidence frequency shifts to the high frequency side, so that the sound insulating property in the high frequency region deteriorates. Therefore, it is conceived that use of a sound insulating interlayer film having a high Young's modulus prevents the coincidence frequency from shifting to the high frequency side. In luxury cars, thick glass plates are used to emphasize the silence in the vehicle interior. However, when a sound insulating interlayer film having a high Young's modulus is used, the sound insulating property tends to deteriorate in the medium frequency region due to the shift of the coincidence frequency on the low frequency side. If one can effectively enhance the sound insulating property at 6300 Hz while effectively preventing deterioration in the sound insulating property at 3150 Hz, it will be possible to improve the silence in the vehicle interior. Conventional laminated glass prepared with a relatively thick glass plate has a problem that it is difficult to effectively enhance the sound insulating property at 6300 Hz while effectively preventing deterioration in sound insulating property at 3150 Hz.

It is an object of the present invention to provide an interlayer film for laminated glass capable of effectively enhancing the sound insulating property at 6300 Hz while effectively preventing deterioration in sound insulating property at 3150 Hz in laminated glass. Moreover, the present invention also aims at providing laminated glass prepared with the interlayer film for laminated glass.

Means for Solving the Problems

According to a broad aspect of the present invention, there is provided an interlayer film for laminated glass (hereinafter, also described as interlayer film) having a one-layer structure or a two or more-layer structure, the interlayer film including a resin layer containing a resin and a plasticizer, and the interlayer film having a resonance frequency X of 550 Hz or more and 740 Hz or less, a loss factor Y in a secondary mode of 0.35 or more, and satisfying a formula: $Y > 0.0008X - 0.142$ in a measurement of resonance frequency in a secondary mode in a damping test for laminated glass according to a central exciting method of laminated glass, when the laminated glass is obtained by arranging the interlayer film between two glass plates of 25 mm wide, 300 mm long and 2 mm thick.

In a specific aspect of the interlayer film according to the present invention, the resin layer contains a thermoplastic resin, or contains a cured product of a photocurable compound or a moisture-curable compound.

In a specific aspect of the interlayer film according to the present invention, the resin layer contains a thermoplastic resin.

In a specific aspect of the interlayer film according to the present invention, the thermoplastic resin is a thermoplastic elastomer.

In a specific aspect of the interlayer film according to the present invention, the thermoplastic elastomer is an aliphatic polyolefin.

In a specific aspect of the interlayer film according to the present invention, the aliphatic polyolefin is a saturated aliphatic polyolefin.

In a specific aspect of the interlayer film according to the present invention, the plasticizer is a plasticizer other than an organic ester plasticizer.

In a specific aspect of the interlayer film according to the present invention, the plasticizer is paraffin oil.

In a specific aspect of the interlayer film according to the present invention, the interlayer film includes a first layer, and a second layer arranged on a first surface side of the first layer.

In a specific aspect of the interlayer film according to the present invention, when the overall thickness of the interlayer film for laminated glass is T, the thickness of the first layer is 0.25T or less.

In a specific aspect of the interlayer film according to the present invention, the interlayer film includes a third layer arranged on a second surface side opposite to the first surface side of the first layer.

In a specific aspect of the interlayer film according to the present invention, the second layer contains a thermoplastic resin and a plasticizer, and the third layer contains a thermoplastic resin and a plasticizer.

In a specific aspect of the interlayer film according to the present invention, the interlayer film is used for obtaining laminated glass by being arranged between a first glass plate having a thickness of 1.8 mm or more and 3 mm or less, and a second glass plate.

In a specific aspect of the interlayer film according to the present invention, the interlayer film is used for obtaining laminated glass by being arranged between a first glass plate and a second glass plate, and a total of a thickness of the first glass plate and a thickness of the second glass plate is 3.6 mm or more and 6 mm or less.

In a broad aspect of the present invention, there is provided a laminated glass including a first lamination glass member, a second lamination glass member and the interlayer film for laminated glass described above, the interlayer film for laminated glass being arranged between the first lamination glass member and the second lamination glass member.

Effect of the Invention

The interlayer film for laminated glass according to the present invention has a one-layer structure or a two or more-layer structure. The interlayer film for laminated glass according to the present invention includes a resin layer containing a resin and a plasticizer. The interlayer film for laminated glass according to the present invention is arranged between two glass plates of 25 mm wide, 300 mm long and 2 mm thick, to obtain laminated glass, and a resonance frequency in a secondary mode of the laminated glass according to a central exciting method is measured by a damping test of laminated glass. In this measurement, in the interlayer film for laminated glass according to the present invention, the resonance frequency X is 550 Hz or more and 740 Hz or less, the loss factor Y in the secondary mode is 0.35 or more, and a formula: $Y > 0.0008X - 0.142$ is satisfied. Since the interlayer film for laminated glass according to the present invention has the configuration as described above, it is possible to effectively enhance the sound insulating property at 6300 Hz while effectively preventing deterioration in sound insulating property at 3150 Hz in laminated glass prepared with the interlayer film for laminated glass according to the present invention.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a chart showing one example of the relationship between the frequency and the transmission loss of the laminated glass.

MODE(S) FOR CARRYING OUT THE INVENTION

Hereinafter, the present invention will be described in detail.

(Interlayer Film for Laminated Glass)

The interlayer film for laminated glass according to the present invention (hereinafter, sometimes described as interlayer film) has a one-layer structure or a two or more-layer structure.

The interlayer film according to the present invention includes a resin layer containing a resin and a plasticizer. It is preferred that the interlayer film according to the present invention include a resin layer containing a resin other than a polyvinyl acetal resin.

The interlayer film according to the present invention is arranged between two glass plates of 25 mm wide, 300 mm long and 2 mm thick, to obtain laminated glass, and a resonance frequency in a secondary mode of the laminated glass according to a central exciting method is measured by a damping test of laminated glass. In the interlayer film for laminated glass according to the present invention, in this measurement, the resonance frequency X is 550 Hz or more and 740 Hz or less, the loss factor Y in the secondary mode is 0.35 or more, and the following formula (1) is satisfied.

$$Y > 0.0008X - 0.142 \tag{1}$$

Since the interlayer film according to the present invention has the configuration as described above, it is possible to effectively enhance the sound insulating property at 6300 Hz while effectively preventing deterioration in sound insulating property at 3150 Hz in laminated glass prepared with the interlayer film according to the present invention.

FIG. 5 is a chart showing one example of the relationship between the frequency and the transmission loss of the laminated glass. In the interlayer film according to the present invention, it is possible to effectively enhance the sound insulating property at 6300 Hz around B in FIG. 5 while effectively preventing deterioration in sound insulating property around A in FIG. 5.

In luxury cars, thick glass plates are used to emphasize the silence in the vehicle interior. In the present invention, it is possible to effectively enhance the sound insulating property even when a thick glass plate having a thickness of 1.8 mm or more is used. Further, in the present invention, it is possible to effectively enhance the sound insulating property even when a thick glass plate having a thickness of 2 mm or more is used.

The glass plates used in measurement of the resonance frequency and the loss factor are two plates of clear glass in conformity with JIS R3202:1996.

The resonance frequency and the loss factor can be specifically measured in the following manner.

The interlayer film is cut into a size of 25 mm wide and 300 mm long. As the first lamination glass member, and the second lamination glass member, two glass plates (clear float glass, 25 mm wide, 300 mm long and 2 mm thick) are prepared. The interlayer film is sandwiched between the two glass plates to obtain a laminate. The laminate is put into a rubber bag and the inside thereof is degassed for 20 minutes at a degree of vacuum of 2.6 kPa, after which the laminate is transferred into an oven while keeping the laminate degassed, and furthermore, held in place at 90° C. for 30 minutes and pressed under vacuum to subject the laminate to preliminary press-bonding. The preliminarily press-bonded laminate is subjected to press-bonding for 20 minutes under conditions of 135° C. and a pressure of 1.2 MPa in an autoclave to obtain a sheet of laminated glass. The obtained laminated glass is stored in an environment at room temperature of 23±2° C. and a humidity of 25±5%. After 8 weeks after completion of the autoclave, the obtained laminated glass is excited with a vibration generator for damping test ("Vibrator G21-005D" available from Shinken. Co., Ltd.) in a thermostatic oven at 20° C. The resultant vibration characteristic is amplified with a mechanical impedance measuring device ("XG-81" available from RION Co., Ltd.), and the vibration spectrum is analyzed with a FFT spectrum analyzer ("FFT analyzer HP3582A" available from Yokogawa Hewlett Packard) to measure a resonance frequency and the loss factor.

From the viewpoint of exerting the effect of the present invention further effectively, the resonance frequency X is preferably 580 Hz or more, more preferably 600 Hz or more, and is preferably 720 Hz or less, more preferably 680 Hz or less.

From the viewpoint of exerting the effect of the present invention further effectively, the loss factor Y is preferably 0.40 or more, more preferably 0.45 or more, and is preferably 0.70 or less, more preferably 0.60 or less.

From the viewpoint of further enhancing the sound insulating property, it is preferred that the glass transition temperature of the resin layer lie within a temperature range of −10° C. to 10° C. When the glass transition temperature of the resin layer lies within a temperature range of −10° C. to 10° C., the resonance frequency X and the loss factor Y are easy to satisfy the above ranges, and easily satisfy the above formula (1).

From the viewpoint of still further enhancing the sound insulating property, it is preferred that the glass transition temperature of the resin layer lies within a temperature range of −8° C. to 0° C.

As a method for measuring the glass transition temperature, a method of measuring viscoelasticity by using "ARES-G2" available from TA Instruments directly after keeping the obtained interlayer film for 12 hours in an environment of room temperature of 23±2° C. and a humidity of 25±5% can be recited. It is preferred to use a parallel plate with a diameter of 8 mm as a jig, and measure the glass transition temperature under the condition in which the temperature is decreased from 100° C. to −50° C. at a temperature decreasing rate of 3° C./minute and under the condition of a frequency of 1 Hz and a strain of 1%. For an interlayer film having a two or more-layer structure, the layers may be delaminated, and the glass transition temperature of the layer to be measured may be measured.

The interlayer film according to the present invention may have a one-layer structure and may have a two or more-layer structure. The interlayer film according to the present invention may have a two-layer structure, may have a three-layer structure, and may have a three or more-layer structure.

The interlayer film according to the present invention may have a one-layer structure of only a first layer. In this case, the first layer is the resin layer.

From the viewpoint of effectively enhancing the sound insulating property and adhesiveness between layers, the interlayer film according to the present invention may include a first layer, and a second layer arranged on a first surface side of the first layer. In this case, it is preferred that the first layer be the resin layer.

From the viewpoint of effectively enhancing the sound insulating property and adhesiveness between layers, the interlayer film according to the present invention may include a first layer, a second layer arranged on a first surface side of the first layer, and a third layer arranged on a second surface side opposite to the first surface side of the first layer. In this case, it is preferred that the first layer be the resin layer.

From the viewpoint of effectively enhancing the sound insulating property and adhesiveness between the interlayer film and the glass plates, it is preferred that the resin layer be not a surface layer in the interlayer film, and it is preferred that the resin layer be an intermediate layer in the interlayer film. It is to be noted that the resin layer may be a surface layer in the interlayer film.

From the viewpoint of enhancing the transparency of the laminated glass, the visible light transmittance of the interlayer film is preferably 70% or more, more preferably 80% or more, further preferably 85% or more.

The visible light transmittance is measured at a wavelength ranging from 380 to 780 nm by using a spectrophotometer ("U-4100" available from Hitachi High-Tech Science Corporation) in conformity with JIS R3211:1998.

The visible light transmittance of the interlayer film may be measured while the interlayer film is arranged between two sheets of clear glass.

For enhancing the visible light transmittance, the interlayer film and the resin layer may not contain a coloring agent, or may not contain carbon black.

The interlayer film is arranged between a first glass plate and a second glass plate to suitably obtain laminated glass. The total of the thickness of the first glass plate and the thickness of the second glass plate is preferably 3.6 mm or more, more preferably 4 mm or more, further preferably 4.2 mm or more. In this case, it is possible to improve the silence in the vehicle interior, and it is possible to effectively enhance the sound insulating property of the laminated glass by the configuration of the present invention. The total of the thickness of the first glass plate and the thickness of the second glass plate is preferably 6 mm or less, more preferably 5 mm or less, further preferably 4.6 mm or less. In this case, it is possible to reduce the weight of the laminated glass.

The interlayer film is arranged between a first glass plate and a second glass plate to suitably obtain laminated glass. The interlayer film is preferably used for obtaining laminated glass by being arranged between a first glass plate having a thickness of 1.8 mm or more (preferably 2 mm or more, more preferably 2.1 mm or more), and a second glass plate. In this case, it is possible to improve the silence in the vehicle interior, and it is possible to effectively enhance the sound insulating property of the laminated glass by the configuration of the present invention. The interlayer film is preferably used for obtaining laminated glass by being arranged between a first glass plate having a thickness of 3 mm or less (preferably 2.6 mm or less, more preferably 2.3 mm or less), and a second glass plate. In this case, it is possible to reduce the weight of the laminated glass.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The second layer 2 is arranged on a first surface side 1a of the first layer 1 to be layered thereon. The third layer 3 is arranged on a second surface 1b side at the opposite side of the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In the interlayer film 11, it is preferred that the first layer 1 be the resin layer. The second layer 2 may be the resin layer, or the third layer 3 may be the resin layer.

In this connection, other layers may be arranged between the second layer 2 and the first layer 1 and between the first layer 1 and the third layer 3, respectively. It is preferred that the second layer 2 and the first layer 1, and the first layer 1 and the third layer 3 be directly layered. Examples of another layer include an adhesive layer, and a layer containing polyethylene terephthalate and the like.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

In the interlayer film 11A, the interlayer film 11A per se is the resin layer.

Hereinafter, the details of the resin layer (which may be a first layer), the first layer, the second layer, and the third layer constituting the interlayer film according to the present invention, and the details of each ingredient contained in the resin layer (which may be a first layer), the first layer, the second layer, and the third layer will be described.

(Resin in First Layer)

Examples of the resin include thermosetting resins and thermoplastic resins. The resin may be a cured product of a photocurable compound or a moisture-curable compound. The cured product of a photocurable compound or a moisture-curable compound may be used as a thermoplastic resin.

It is preferred that the first layer (the resin layer) contain a thermoplastic resin (hereinafter, sometimes described as a thermoplastic resin (1)), or contain a cured product of a photocurable compound or a moisture-curable compound (hereinafter, sometimes described as a cured product (1)). The thermoplastic resin (1) and the cured product (1) are collectively called a resin (1). One kind of the resin (1) may be used alone, and two or more kinds thereof may be used in combination.

From the viewpoint of effectively enhancing the sound insulating property, it is preferred that each of the thermoplastic resins in the thermoplastic resin layer and the first layer be a thermoplastic elastomer. The thermoplastic resin means a resin that softens and exhibits plasticity when it is heated, and hardens when it is cooled to room temperature. Among the thermoplastic resins, especially the thermoplastic elastomer means a resin that softens and exhibits plasticity when it is heated, and hardens to exhibits rubber elasticity when it is cooled to room temperature (25° C.).

In 100% by weight of the thermoplastic resin in the thermoplastic resin layer or the first layer, the content of the thermoplastic elastomer is preferably 50% by weight or more, more preferably 60% by weight or more, further preferably 70% by weight or more, especially preferably 80% by weight or more, most preferably 90% by weight or more. The whole of thermoplastic resin in the thermoplastic elastomer layer may be the thermoplastic elastomer.

The present inventors investigated for enhancing of the sound insulating property of laminated glass in an interlayer film including a layer prepared with a resin. As a result, the present inventors found a configuration with which the sound insulating property of laminated glass can be enhanced. As a result, the present inventors found a configuration capable of effectively enhancing the sound insulating property at 6300 Hz while effectively preventing deterioration in sound insulating property at 3150 Hz, in laminated glass including an interlayer film having a layer prepared with a resin component (thermoplastic component or the like) other than a polyvinyl acetal resin.

The present inventors investigated for enhancing the sound insulating property of laminated glass also in an interlayer film including a layer prepared with a thermoplastic component other than a polyvinyl acetal resin. As a result, the present inventors found a configuration capable of effectively enhancing the sound insulating property at 6300 Hz while effectively preventing deterioration in sound insulating property at 3150 Hz, also in laminated glass including an interlayer film having a layer prepared with a resin component (thermoplastic component or the like) other than a polyvinyl acetal resin.

Examples of the thermoplastic resin (1) include an aliphatic polyolefin, polystyrene, an ethylene-vinyl acetate copolymer resin, an ethylene-acrylic acid copolymer resin, a polyurethane resin, a polyvinyl alcohol resin, a polyvinyl acetate resin, and a polyester resin, and the like.

The thermoplastic resins exemplified above can be a thermoplastic elastomer by adjusting the molecular structure, the polymerization degree and the like of the resin.

From the viewpoint of effectively enhancing the sound insulating property, it is preferred that the resin (1) in the resin layer be a thermoplastic resin. The resin layer may be a thermoplastic resin layer. From the viewpoint of effectively enhancing the sound insulating property, the thermoplastic resin be more preferably a polyvinyl acetal resin, a polyester resin, or polyvinyl acetate, further preferably a polyester resin or polyvinyl acetate, especially preferably polyvinyl acetate.

The photocurable compound or the moisture-curable compound is preferably a curable compound having a (meth)acryloyl group, and is more preferably a (meth)acryl polymer. The resin is preferably a curable compound having a (meth)acryloyl group, and is more preferably a (meth)acryl polymer.

It is preferred that the (meth)acryl polymer be a polymer of a polymerizable composition containing a curable compound having a (meth)acryloyl group. The polymerizable composition contains a polymerizable component. In order to effectively form the cured product in the layer containing the cured product, the polymerizable composition may contain a photoreaction initiator. The polymerizable composition may contain an auxiliary for accelerating the curing reaction together with the photoreaction initiator. Representatives of the curable compound having a (meth)acryloyl group include (meth)acrylic ester. It is preferred that the (meth)acrylic polymer be a poly(meth)acrylic ester.

For effectively obtaining the effect of the present invention, it is preferred that the polymerizable component include a (meth)acrylic ester having a cyclic ether structure, a (meth)acrylic ester having an aromatic ring, a (meth) acrylic ester having a polar group, or an acyclic (meth) acrylic ester having 6 or less carbon atoms in the side chain. By using such a preferred (meth)acrylic ester, it is possible to enhance both the sound insulating property and the ability to prevent foaming in good balance.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetane-3-yl)methyl (meth)acrylate, (3-propyloxetane-3-yl)methyl (meth)acrylate, (3-ethyloxetane-3-yl)methyl (meth)acrylate, (3-butyloxetane-3-yl)methyl (meth)acrylate, (3-ethyloxetane-3-yl)ethyl (meth)acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, (3-ethyloxetane-3-yl)hexyl (meth)acrylate; tetrahydrofurfuryl (meth)acrylate, γ-butyrolactone (meth)acrylate, (2,2-dimethyl-1,3-dioxolanedioxolane-4-yl)methyl (meth)acrylate, (2-methyl-2-ethyl-1,3-dioxolane-4-yl)methyl (meth)acrylate, (2-methyl-2-isobutyl-1,3-dioxolane-4-yl)methyl (meth)acrylate, (2-cyclohexyl-1,3-dioxolane-4-yl)methyl (meth)acrylate, tetrahydrofurfuryl alcohol acrylic acid multimer ester; tetrahydro-2H-pyran-2-yl-(meth)acrylate, 2-{1-[(tetrahydro-2H-pyran-2-yl)oxy]-2-methylpropyl}(meth)acrylate, cyclic trimethylol propane formal acrylate, (meth) acryloyl morpholine and the like. From the viewpoint of effectively obtaining the effect of the present invention, it is especially preferred that the (meth)acrylic ester having a cyclic ether structure be tetrahydrofurfuryl (meth)acrylate, or cyclic trimethylol propane formal acrylate.

Examples of the (meth)acrylic ester having an aromatic ring include benzyl acrylate, phenoxypolyethyleneglycol acrylate and the like.

Examples of the (meth)acrylic ester having a polar group include (meth)acrylic esters having a hydroxyl group, an amide group, an amino group, and an isocyanate group or the like as the polar group.

Examples of the (meth)acrylic ester having a hydroxyl group include 2-hydroxyethyl (meth)acrylate, and hydroxypropyl (meth)acrylate and the like.

Examples of the (meth)acrylic ester having an amide group include N,N-dimethylaminopropyl (meth)acrylamide, N,N-dimethyl (meth)acrylamide, (meth)acryloyl morpholine, N-isopropyl (meth)acrylamide, and N-hydroxyethyl (meth)acrylamide and the like.

Examples of the (meth)acrylic ester having an amide group or an amino group include N-dialkylaminoalkyl (meth)acrylamide, and N,N-dialkylaminoalkyl (meth)acrylamide and the like.

Examples of the (meth)acrylic ester having an isocyanate group include triallylisocyanurate, and derivatives thereof and the like.

The above-described (meth)acrylic ester may be a polycarboxylic ester having a (meth)acryloyl group. Examples of the polycarboxylic ester having a (meth)acryloyl group include 2-acryloyloxyethyl succinate and the like.

From the viewpoint of effectively obtaining the effect of the present invention, it is preferred that the polymerizable component be a (meth)acrylic ester having a hydroxyl group, especially preferably 2-hydroxyethyl (meth)acrylate, or hydroxypropyl (meth)acrylate.

Examples of the acyclic (meth)acrylic ester having 6 or less carbon atoms in the side chain include methyl (meth)acrylate, ethyl (meth)acrylate, propyl (meth)acrylate, and butyl (meth)acrylate and the like.

For effectively obtaining the effect of the present invention, it is preferred that the blending amount of the acyclic (meth)acrylic ester having 8 or more carbon atoms in the side chain in 100% by weight of the polymerizable component be less than 20% by weight.

Examples of the (meth)acrylic ester include besides the compounds as recited above, diethyleneglycol monoethylether (meth)acrylate, isobornyl (meth)acrylate, 3-methoxybutyl (meth)acrylate, 2-acryloyloxyethyl-2-hydroxypropylphthalate, 2-acryloyloxyethyl-2-hydroxylpropylphthalate, cyclohexyl (meth)acrylate; ethylene glycol di(meth)acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth)acrylate; trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-acryloyloxyethyl)phosphate, tetramethylol methane tri(meth)acrylate, tetramethylol propane tetra(meth)acrylate, derivatives thereof and the like.

One kind of the (meth)acrylic ester may be used alone, and two or more kinds thereof may be used in combination. The above-described (meth)acryl polymer may be a homopolymer of the above-described (meth)acrylic ester, or may be a copolymer of a polymerizable component containing the above-described (meth)acrylic ester.

Concrete examples of the photoreaction initiator include 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl)titanium, 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, diethoxyacetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propane-1-one, 2-benzyl-2-dimethylamino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, (4-benzoylbenzyl)trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6-trimethylbenzoyl)-phenylphosphine oxide, triphenylmethylium tetrakis (pentafluorophenyl) borate and the like. Only one kind of the photoreaction initiator may be used, and two or more kinds thereof may be used in combination.

Examples of the auxiliary include triethanolamine, triisopropanolamine, 4,4'-dimethylaminobenzophenone (Michler's ketone), 4,4'-diethylaminobenzophenone, 2-dimethylaminoethyl benzoic acid, and ethyl 4-dimethylaminobenzoate and the like. Also, examples of the auxiliary include (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone and the like. One kind of the auxiliary may be used alone and two or more kinds thereof may be used in combination.

It is preferred that the auxiliary be benzyldimethylketal, 1-hydroxycyclohexylphenyl ketone, benzoylisopropyl ether, 4-(2-hydroxyethoxy)-phenyl(2-hydroxy-2-propyl) ketone, 2-hydroxy-2-methyl-1-phenylpropane-1-one, or triphenylmethylium tetrakis(pentafluorophenyl) borate.

In 100% by weight of the polymerizable composition, the content of the photoreaction initiator is preferably 0.01% by weight or more, more preferably 0.1 parts by weight or more and is preferably 10% by weight or less, more preferably 5% by weight or less. When the content of the photoreaction initiator is in the range from the above-described lower limit to the above-described upper limit, the photocurability and the storage stability further increase.

It is preferred that the polyvinyl acetate be a polymer of a polymerizable composition containing vinyl acetate and a monomer having the above-described functional group because excellent effect of the present invention is achieved.

Examples of the monomer having the above-described functional group include 3-methyl-3-buten-1-ol, ethylene glycol monovinyl ether, isopropylacrylamide and the like.

From the viewpoint of effectively enhancing the sound insulating property, the weight average molecular weight of the polyvinyl acetate is preferably 250000 or more, more preferably 300000 or more, further preferably 400000 or more, especially preferably 500000 or more. From the viewpoint of enhancing the interlayer adhesion, the weight average molecular weight of the polyvinyl acetate is preferably 1200000 or less, more preferably 900000 or less.

The weight average molecular weight refers to a weight average molecular weight, calculated on the polystyrene equivalent basis, measured by gel permeation chromatography (GPC).

The method for polymerizing the polymerizable composition to synthesize the polyvinyl acetate is not particularly limited. Examples of the synthesizing method include a solution polymerization, suspension polymerization, UV polymerization and the like.

From the viewpoint of increasing the transparency of the interlayer film, and effectively enhancing the sound insulating property and the interlayer adhesion in the interlayer film having increased transparency, the synthesizing method of the polyvinyl acetate is preferably solution polymerization.

From the viewpoint of effectively enhancing the sound insulating property, the thermoplastic elastomer is preferably an aliphatic polyolefin or a styrene elastomer, and is more preferably an aliphatic polyolefin.

The aliphatic polyolefin may be a saturated aliphatic polyolefin, or may be an unsaturated aliphatic polyolefin. The aliphatic polyolefin may be a polyolefin composed of a chain olefin as a monomer, or may be a polyolefin composed of a cyclic olefin as a monomer. From the viewpoint of effectively enhancing the storage stability and the sound insulating property of the interlayer film, it is preferred that the aliphatic polyolefin be a saturated aliphatic polyolefin.

Examples of the material for the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonene, trans-2-nonene, cis-2-nonene, trans-3-nonene, cis-3-nonene, trans-4-nonene, cis-4-nonene, 1-decene, trans-2-decene, cis-2-decene, trans-3-decene, cis-3-decene, trans-4-decene, cis-4-decene, trans-5-decene, cis-5-decene, 4-methyl-1-pentene, and vinylcyclohexane.

From the viewpoint of effectively enhancing the sound insulating property, it is preferred that the aliphatic polyolefin have a chained hydrocarbon group on a side chain.

When the interlayer film has a multilayer structure, the aliphatic polyolefin may be a modified aliphatic polyolefin from the viewpoint of improving the interlayer adhesive strength. It is preferred that the modified aliphatic polyolefin have a carboxyl group, a carboxylic anhydride group, a hydroxyl group or an epoxy group or the like. The modified aliphatic polyolefin may have these groups on a side chain of the molecular chain, or on a terminus.

(Thermoplastic Resin in Second Layer and Third Layer)

From the viewpoint of effectively enhancing the adhesiveness between the interlayer film and the glass plates, it is preferred that the second layer contain a thermoplastic resin (hereinafter, sometimes described as a thermoplastic resin (2)). From the viewpoint of effectively enhancing the adhesiveness between the interlayer film and the glass plates, it is preferred that the second layer contain a thermoplastic resin other than the thermoplastic resin of the first layer, and it is more preferred that the second layer contain a polyvinyl acetal resin (hereinafter, sometimes described as polyvinyl acetal resin (2)). From the viewpoint of effectively enhancing the adhesiveness, it is preferred that the third layer contain a thermoplastic resin (hereinafter, sometimes described as a thermoplastic resin (3)). From the viewpoint of effectively enhancing the adhesiveness between the interlayer film and the glass plates, it is preferred that the third layer contain a thermoplastic resin other than the thermoplastic resin, and it is more preferred that the third layer contain a polyvinyl acetal resin (hereinafter, sometimes described as polyvinyl acetal resin (3)).

Examples of the thermoplastic resins (2), (3) include a polyvinyl acetal resin, an ethylene-vinyl acetate copolymer resin, an ethylene-acrylic acid copolymer resin, a polyurethane resin, and a polyvinyl alcohol resin, a polyvinyl acetate resin, a polyester resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more, and preferably 40% by mole or less, and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups co which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may also be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

The resin layer contains a plasticizer. One kind of the plasticizer in the resin layer may be used alone, and two or more kinds thereof may be used in combination.

From the viewpoint of effectively enhancing the sound insulating property, it is preferred that the first layer contain a plasticizer (hereinafter, sometimes described as a plasticizer (1)). From the viewpoint of effectively enhancing the sound insulating property, it is preferred that the second layer contain a plasticizer (hereinafter, sometimes described as a plasticizer (2)). From the viewpoint of effectively enhancing the sound insulating property, it is preferred that the third layer contain a plasticizer (hereinafter, sometimes described as a plasticizer (3)). One kind of the plasticizer in these layers may be used alone, and two or more kinds thereof may be used in combination.

Examples of the plasticizer include paraffin oil, an organic ester plasticizer, and a phosphate plasticizer, and the like. Examples of the organic ester plasticizer include a monobasic organic acid ester, a polybasic organic acid ester, and the like. Examples of the phosphate plasticizer include an organic phosphate plasticizer and an organic phosphite plasticizer, and the like. It is preferred that the plasticizer be a liquid plasticizer.

Examples of the paraffin oil include naphthenic process oil, white mineral oil, mineral oil, paraffin wax, liquid paraffin, and the like.

Examples of commercially available paraffin oil include "Diana process oil PW-90" available from Idemitsu Kosan Co., Ltd., "Diana process oil PW-100" available from Idemitsu Kosan Co., Ltd., "Diana process oil PW-32" available from Idemitsu Kosan Co., Ltd., and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbirol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl maleate, bis(2-butoxyethyl) adipate, dibutyl adipate, diisobutyl adipate, 2,2-butoxyethoxyethyl adipate, benzoic acid glycol ester, adipic acid 1,3-butyleneglycol polyester, dihexyl adipate, dioctyl adipate, hexyl cyclohexyl adipate, a mixture of heptyl adipate and nonyl adipate, diisononyl adipate, diisodecyl adipate, heptyl nonyl adipate, tributyl citrate, tributyl acetylcitrate, diethyl carbonate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic ester plasticizer include a diester plasticizer represented by the following structural formula (11)

[Chemical 1]

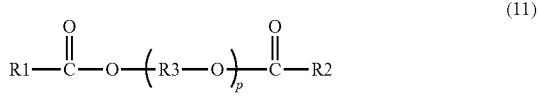

In the foregoing formula (11), R1 and R2 each represent an organic group with 5 to 10 carbon atoms, R3 represents an ethylene group, an isopropylene group or a n-propylene group, and p represents an integer of 3 to 10. It is preferred that R1 and R2 in the foregoing formula (11) each be an organic group with 6 to 10 carbon atoms.

Examples of the organic phosphate plasticizer include tributoxyethyl phosphate, isodecyl phenyl phosphate, triisopropyl phosphate, and the like.

When the resin of the first layer is a thermoplastic elastomer, the plasticizing effect can be low if the organic ester plasticizer is used. When a thermoplastic elastomer is used as the thermoplastic resin of the first layer, it is preferred that the plasticizer in the first layer be a plasticizer other than an organic ester plasticizer. When a thermoplastic elastomer is used as the thermoplastic resin of the first layer, the resonance frequency X and the loss factor Y are easy to satisfy the aforementioned preferred ranges, and can easily satisfy the above formula (1) by using a plasticizer other than an organic ester plasticizer as the plasticizer in the first layer. As a result, the effect of the present invention can be exerted more effectively.

When the resin of the first layer is a thermoplastic elastomer (in particular, aliphatic polyolefin), it is preferred that the plasticizer in the first layer be a paraffin oil. In this case, it is possible to enhance the sound insulating property.

When the resin of the first layer is polyvinyl acetate, the plasticizer in the first layer is preferably an organic ester plasticizer, and is more preferably an adipic acid ester. In this case, the resonance frequency X and the loss factor Y are easy to satisfy the above ranges, and easily satisfy the above formula (1). As a result, the effect of the present invention can be exerted more effectively.

When the first layer contains a cured product of a photocurable compound or a moisture-curable compound (in particular, a curable compound having a (meth)acryloyl group), it is preferred that the plasticizer in the first layer be an organic ester plasticizer. In this case, the resonance frequency X and the loss factor Y are easy to satisfy the above ranges, and easily satisfy the above formula (1). As a result, the effect of the present invention can be exerted more effectively.

From the viewpoint of effectively enhancing the adhesiveness between the glass plates and the interlayer film, it is preferred that each of the plasticizer in the second layer and the plasticizer in the third layer be an organic ester plasticizer, and it is more preferred that each of the plasticizer in the second layer and the plasticizer in the third layer be a diester plasticizer represented by the above formula (11). From the viewpoint of effectively enhancing the adhesiveness between the glass plates and the interlayer film, it is preferred that each of the plasticizer in the second layer and the plasticizer in the third layer contain triethylene glycol di-2-ethylhexanoate (3GO) or triethylene glycol di-2-ethylbutyrate (3GH). From the viewpoint of effectively enhancing the adhesiveness between the glass plates and the interlayer film, it is more preferred that triethylene glycol di-2-ethylhexanoate be contained.

In the first layer, the content of the plasticizer relative to 100 parts by weight of the resin (1) is referred to as content (1). When the resin (1) is the thermoplastic resin (1), 100 parts by weight of the resin (1) is 100 parts by weight of the thermoplastic resin (1). From the viewpoint of effectively enhancing the sound insulating property, the content (1) is preferably 10 parts by weight or more, more preferably 20 parts by weight or more, and is preferably 60 parts by weight or less, more preferably 50 parts by weight or less. When the content (1) is the above lower limit or more, it is possible to effectively enhance the sound insulating property. When the content (1) is the above upper limit or less, the penetration resistance of laminated glass is further enhanced.

When the resin (thermoplastic resin) of the first layer is a thermoplastic elastomer, the content (1) is preferably 20 parts by weight or more, more preferably 25 parts by weight or more, and is preferably 45 parts by weight or less, more preferably 40 parts by weight or less. When the content (1) is the above lower limit or more and the above upper limit or less, the resonance frequency X and the loss factor Y are easy to satisfy the above ranges, and easily satisfy the above formula (1). As a result, the effect of the present invention can be exerted more effectively.

When the resin (thermoplastic resin) of the first layer is polyvinyl acetate, the content (1) is preferably 30 parts by weight or more, more preferably 35 parts by weight or more, and is preferably 100 parts by weight or less, more preferably 90 parts by weight or less. In the case where polyvinyl acetate is used as the resin of the first layer, the resonance frequency X and the loss factor Y are easy to satisfy the above ranges, and easily satisfy the above formula (1) when the content (1) is the above lower limit or more and the above upper limit or less. As a result, the effect of the present invention can be exerted more effectively.

When the first layer contains a cured product of a photocurable compound or a moisture-curable compound (in particular, a curable compound having a (meth)acryloyl group), the content (1) is preferably 15 parts by weight or more, more preferably 20 parts by weight or more, and is preferably 60 parts by weight or less, more preferably 50 parts by weight or less. In the case where a photocurable compound or a moisture-curable compound is used as the resin of the first layer, the resonance frequency X and the loss factor Y are easy to satisfy the above ranges, and easily satisfy the above formula (1) when the content (1) is the above lower limit or more and the above upper limit or less. As a result, the effect of the present invention can be exerted more effectively.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 10 parts by weight or more, more preferably 15 parts by weight or more, further preferably 20 parts by weight or more, especially preferably 24 parts by weight or more, most preferably 25 parts by weight or more, and is preferably 45 parts by weight or less, more preferably 40 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

(Heat Shielding Substance)

The interlayer film may contain a heat shielding substance (heat shielding compound). The first layer may contain a heat shielding substance. The second layer may contain a heat shielding substance. The third layer may contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

Ingredient X:

The interlayer film may contain at least one kind of Ingredient X among a phthalocyanine compound, a naphthalocyanine compound and an anthracyanine compound. The first layer may contain the Ingredient X. The second layer may contain the Ingredient X. The third layer may contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

The interlayer film may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaB6) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

The interlayer film may contain an alkali metal salt, an alkali earth metal salt, or a magnesium salt (hereinafter, these are sometimes described as Metal salt M). The first layer may contain the Metal salt M. The second layer may contain the metal salt M. The third layer may contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain as metal Li, Na, K, Rb, Cs, Mg, Ca, Sr or Ba. It is preferred that the metal salt included in the interlayer film contain a K salt or Mg salt.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

The magnesium carboxylate with 2 to 16 carbon atoms and the potassium carboxylate with 2 to 16 carbon atoms are not particularly limited. Examples of these include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more. The total of the contents of Mg and K in an interlayer film containing the Metal salt M or a layer containing the Metal salt M (a first layer, a second layer, or a third layer) is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

The interlayer film may contain an ultraviolet ray screening agent. The first layer may contain an ultraviolet ray screening agent. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, especially preferably 0.5% by weight or more. In 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period is further suppressed. In particular, by setting the content of the ultraviolet ray screening agent to be 0.2% by weight or more in 100% by weight of a layer containing the ultraviolet ray screening agent, with regard to a laminate containing a resin film and glass plates, the lowering in visible light transmittance thereof after the lapse of a certain period of time can be significantly suppressed.

(Oxidation Inhibitor)

The interlayer film may contain an oxidation inhibitor. The first layer may contain an oxidation inhibitor. The second layer may contain an oxidation inhibitor. The third layer may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl F-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3, 5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, and the third layer may contain other ingredient as necessary. Examples of the other ingredient include a coupling agent, a dispersing agent, a surfactant, a flame retardant, an antistatic agent, a pigment, a dye, an adhesive strength adjusting agent (other than metal salt) for between a lamination glass member and a layer being in contact with the lamination glass member, an interlayer adhesive strength adjusting agent (other than metal salt) a moisture-resistance agent, a fluorescent brightening agent, and an infrared ray absorber. One kind of the other ingredient may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film (thickness of the entire interlayer film) is referred to as T. The thickness of each of the resin layer and the first layer is preferably 0.035T or more, more preferably 0.0625T or more, further preferably 0.1T or more and is preferably 0.4T or less, more preferably 0.375T or less, further preferably 0.25T or less, particularly preferably 0.15T or less. When the thickness of the resin layer and the first layer is 0.4T or less, the flexural rigidity is further improved.

The thickness of each of the second layer and the third layer is preferably 0.3T or more, more preferably 0.3125T or more, further preferably 0.375T or more and is preferably 0.97T or less, more preferably 0.9375T or less, further preferably 0.9T or less. The thickness of each of the second layer and the third layer may be 0.46875T or less, and may be 0.45T or less. When the thickness of each of the second layer and the third layer is the above-described lower limit or more and the above-described upper limit or less, the rigidity and the sound insulating property of the laminated glass are further enhanced.

A total thickness of the second layer and the third layer is preferably 0.625T or more, more preferably 0.75T or more, further preferably 0.85T or more and is preferably 0.97T or less, more preferably 0.9375T or less, further preferably 0.9T or less. When the total thickness of the second layer and the third layer is the above-described lower limit or more and the above-described upper limit or less, the rigidity and the sound insulating property of the laminated glass are further enhanced.

The interlayer film may be an interlayer film having a uniform thickness, and may be an interlayer film having varying thickness. The sectional shape of the interlayer film may be a rectangular shape and may be a wedge-like shape. The interlayer film may be wound, and the interlayer film may be made into a roll body.

The production method of the interlayer film according to the present invention is not particularly limited. In the case of a single-layered interlayer film, examples of the production method of the interlayer film according to the present invention include a method of extruding a resin composition with an extruder. In the case of a multi-layered interlayer film, examples of the production method of the interlayer film according to the present invention include a method of separately forming resin compositions used for constituting respective layers into respective layers, and then, for example, layering the obtained layers, a method of coextruding resin compositions used for constituting respective layers with an extruder and layering the layers, and the like. From the viewpoint of effectively enhancing the adhesiveness between layers of the interlayer film, a method of laminating after subjecting the first layer to a plasma treatment or a corona treatment can be recited. In the method of laminating after subjecting the first layer to a plasma treatment or a corona treatment, the resonance frequency X and the loss factor Y are easy to satisfy the above ranges, and easily satisfy the above formula (1). As a result, the effect of the present invention can be exerted more effectively. Also from the viewpoint of increasing the continuous productivity, a production method of extrusion-molding is preferred.

It is preferred that the second layer and the third layer contain the same polyvinyl acetal resin. This case realizes excellent production efficiency of the interlayer film. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Laminated Glass)

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of a third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11a of the interlayer film 11A. The second lamination glass member 22 is layered on the second surface 11b opposite to the first surface 11a of the interlayer film 11A.

As described above, the laminated glass according to the present invention includes a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

It is preferred that the first lamination glass member be the first glass plate. It is preferred that the second lamination glass member be the second glass plate.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, more preferably 1.8 mm or more, further preferably 2 mm or more, especially preferably 2.1 mm or more and is preferably 5 mm or less, more preferably 3 mm or less. When the lamination glass member is a glass plate, the thickness of the glass plate is preferably 1 mm or more, more preferably 1.8 mm or more, further preferably 2 mm or more, especially preferably 2.1 mm or more and is preferably 5 mm or less, more preferably 3 mm or less, further preferably 2.6 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, or roof glass of an automobile, and the like. The interlayer film and the laminated glass are suitably used for automobiles. The interlayer film is used for obtaining laminated glass of an automobile.

Hereinafter, the present invention will be described in more detail with reference to examples and comparative examples. The present invention is not limited only to these examples.

Example 1

Preparation of Composition for Forming First Layer:

The following ingredients were mixed, and kneaded sufficiently with a mixing roll to obtain a composition for forming a first layer.

Aliphatic polyolefin ("ABSORTOMER EP-1001" available from Mitsui Chemicals, Inc.; thermoplastic elastomer) 100 parts by weight Paraffin oil ("Diana process oil PW-90" available from Idemitsu Kosan Co., Ltd.) 40 parts by weight Adhesive strength adjusting agent for between layer and glass plate ("ARUFON UH-2041" available from TOAGOSEI CO., LTD.) 5 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

By extruding the obtained composition for forming the first layer with an extruder, a single-layered interlayer film (thermoplastic elastomer interlayer film, thickness: 800 μm) was prepared.

Preparation of Laminated Glass (for Measuring Sound Insulating Property):

The obtained interlayer film was cut into a size of 25 mm wide and 300 mm long. As the first lamination glass member, and the second lamination glass member, two glass plates (clear float glass, 25 mm wide, 300 mm long and 2 mm thick) were prepared. The interlayer film was sandwiched between the two glass plates to obtain a laminate. The laminate was put into a rubber bag and the interior of the bag was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a sheet of laminated glass.

Example 2

Preparation of Interlayer Film:

Aliphatic polyolefin ("ABSORTOMER EP-1001" available from Mitsui Chemicals, Inc.; thermoplastic elastomer) was dissolved in toluene in a concentration of 25% by weight to obtain a toluene solution. To the toluene solution, 35 parts by weight of paraffin oil ("Diana process oil PW-32" available from Idemitsu Kosan Co., Ltd.), relative to 100 parts by weight of ABSORTOMER was added, and stirred so that the solution was homogenous. Next, the solution was applied on a mold-release-treated PET film so that the thickness after drying was 50 μm by using a coater, and dried at 120° C. for 1 hour, to obtain a resin film. A plurality of the obtained resin films having a thickness of 50 μm were layered to obtain a first layer having a thickness of 100 μm.

Further, one of the surfaces of the first layer was irradiated with plasma, and directly after irradiation, a second layer having a thickness of 350 μm was pasted on the surface irradiated with plasma.

Composition of Second Layer:

Polyvinyl acetal resin (1) (average polymerization degree: 1700, using n-butyl aldehyde, acetalization degree 68.5% by mole, content of hydroxyl group: 30.7% by mole, acetylation degree: 0.8% by mole) 100 parts by weight Triethylene glycol di-2-ethylhexanoate (3GO): 37.5 parts by weight An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Next, the other of the surfaces of the first layer was irradiated with plasma in the same manner, and a third layer (having the same composition as the second layer) having a thickness of 350 μm was pasted on the surface.

An interlayer film (800 μm thick) having a laminate structure of the second layer (350 μm thick)/the first layer (100 μm thick)/the third layer (350 μm thick) was prepared.

Laminated glass was obtained in the same manner as that in Example 1 except that the obtained interlayer film was used.

Comparative Example 1

The following ingredients were mixed, and kneaded sufficiently with a mixing roll to obtain a composition for forming a first layer.

Polyvinyl acetal resin (2) (average polymerization degree: 3050, using n-butyl aldehyde, acetalization degree 63.7% by mole, content of hydroxyl group: 24.2% by mole, acetylation degree: 12.1% by mole)

Triethylene glycol di-2-ethylhexanoate (3GO): 60 parts by weight

An amount that is 0.2% by weight in the obtained interlayer film of an ultraviolet ray screening agent (2-(2-hydroxy-3-t-butyl-5-methylphenyl)-5-chlorobenzotriazole)

An amount that is 0.2% by weight in the obtained interlayer film of an oxidation inhibitor (2,6-di-t-butyl-p-cresol)

Preparation of Composition for Forming Second Layer and Third Layer:

A composition for forming a second layer and a third layer was obtained in the same manner in Example 2 except that the blending amount of triethylene glycol di-2-ethylhexanoate (3GO) was changed to 31.5 parts by weight.

Preparation of Interlayer Film and Laminated Glass:

By coextruding the composition for forming a first layer and a composition for forming a second layer and a third layer using a coextruder, an interlayer film (800 μm in thickness) having a layered structure with a stack of a second layer (350 μm in thickness)/a first layer (100 μm in thickness)/a third layer (350 μm in thickness) was prepared.

Laminated glass was obtained in the same manner as in Example 1 except that the aforementioned composition for forming each layer was used and the interlayer film was prepared in the method as described above.

Comparative Example 2

An interlayer film and laminated glass were obtained in the same manner as that in Example 2 except that the blending amount of the plasticizer was set to that shown in the following Table 2.

Comparative Examples 3, 4

An interlayer film and laminated glass were obtained in the same manner as that in Comparative Example 1 except that the blending amount of the plasticizer was set to that shown in the following Table 2.

(Synthesis of (Meth)Acryl Polymers (1) to (7))

A polymerizable composition having the blending composition shown in the following Table 3 was sandwiched between two PET sheets treated to have a mold releasability on one side (available from NIPPA, having a thickness of 50 μm) to form a polymerizable composition layer having a thickness of 100 μm. A spacer was arranged around the two PET sheets. The polymerizable composition layer was irradiated with ultraviolet rays at a dose of 3000 mJ/cm² with a high pressure mercury UV lamp to cure the polymerizable composition by reaction. (Meth)acryl polymers (1) to (6) were obtained as mixtures containing a plasticizer (3GO or ATBC). (Meth)acryl polymer (7) was obtained as a cured product not containing a plasticizer.

(Synthesis of Polyvinyl Acetate (1))

A glass polymerization vessel equipped with a reflux condenser, a dropping funnel, a thermometer, and a nitrogen inlet was prepared. This polymerization vessel was charged with 100 parts by weight of vinyl acetate monomer, 1.0 part by weight of 3-methyl-3-buten-1-ol, and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator, 150 parts by weight of vinyl acetate monomer, and 1.5 parts by weight of 3-methyl-3-buten-1-ol were dropped over 4 hours, and polymerized for 2 hours after end of the dropping, and thus a solution containing polyvinyl acetate was obtained. The solution was dried for 3 hours in an oven at 110° C. to obtain polyvinyl acetate (1).

(Synthesis of Polyvinyl Acetate (2))

A glass polymerization vessel equipped with a reflux condenser, a dropping funnel, a thermometer, and a nitrogen inlet was prepared. This polymerization vessel was charged with 250 parts by weight of vinyl acetate monomer and 3.8 parts by weight of methanol, and heated and stirred, and the interior of the polymerization vessel was replaced by nitrogen. Then the inner temperature of the polymerization vessel was controlled to 60° C., and 0.06 parts by weight of tert-butylperoxy neodecanate which is a polymerization initiator was dropped over 2.5 hours, and polymerized for 2 hours after end of the dropping, and thus a solution containing polyvinyl acetate was obtained. The solution was dried for 3 hours in an oven at 110° C. to obtain polyvinyl acetate (2).

Example 3

Preparation of First Layer:

A mixture (layer containing a cured product) containing 100 parts by weight of the (meth)acryl polymer (1) obtained in the above, and 15 parts by weight of a plasticizer (3GO) was prepared.

Preparation of Fourth Layer and Fifth Layer:

As the fourth layer and the fifth layer, PET film (1) ("TOYOBO ester film E5100" available from TOYOBO CO., LTD., 50 μm thick) was prepared.

Preparation of Second Layer and Third Layer:

The following ingredients were mixed, and kneaded sufficiently with a mixing roll to obtain a composition for forming a second layer and a third layer.

Polyvinyl acetal resin (3) (average polymerization degree: 1700, using n-butyl aldehyde, content of hydroxyl group: 31% by mole, butyralization degree: 68% by mole, acetylation degree: 1% by mole) 100 parts by weight Plasticizer (3GO) 35 parts by weight An amount that is 70 ppm in the obtained interlayer film of Metal salt M (Mg mixture)

An amount that is 0.2% by weight in the obtained interlayer film of an ultraviolet ray screening agent (Tinuvin326)

An amount that is 0.2% by weight in the obtained interlayer film of an oxidation inhibitor (BHT)

The composition for forming the second layer and the third layer was extruded with an extruder to obtain the second layer and the third layer.

Preparation of Interlayer Film:

The first layer was sandwiched between the fourth layer and the fifth layer to obtain a three-layer laminate. By arranging second layer and the third layer on the outer sides of the laminate, and laminating with a roll laminator ("GDRB316 A3" available from ACCO BRANDS JAPAN) at 100° C. and a speed setting 3, an interlayer film having a structure of the second layer/the fourth layer/the first layer/the fifth layer/the third layer was obtained.

Laminated glass was obtained in the same manner as that in Example 1 except that the obtained interlayer film was used.

Examples 4 to 8, Comparative Example 5

An interlayer film and laminated glass were obtained in the same manner as that in Example 3 except that the kinds and the amounts of the ingredients were set to that shown in the following Tables 4 and 5. In Examples 4 to 8 and Comparative Example 5, the same kinds of the ultraviolet ray screening agent and the oxidation inhibitor as those used in Example 3 were blended in the same blending amounts as those in Example 3 (blending amounts in the second layer and in the third layer), and the Mg mixture of the same kind as that in Example 3 was blended in the same blending amount as that in Example 3 (blending amounts in the second layer and the third layer).

Example 9

Preparation of Composition for Forming First Layer:

The following ingredients were mixed, and kneaded sufficiently with a mixing roll to obtain a composition for forming a first layer.

Polyvinyl acetate (1) 100 parts by weight

Plasticizer (Bis(2-butoxyethyl) adipate (D931)) 80 parts by weight

An amount that is 0.2% by weight in the obtained interlayer film of an ultraviolet ray screening agent (Tinuvin326)

An amount that is 0.2% by weight in the obtained interlayer film of an oxidation inhibitor (BHT)

Preparation of Composition for Forming Second Layer and Third Layer:

The following ingredients were mixed, and kneaded sufficiently with a mixing roll to obtain a composition for forming a second layer and a third layer.

Polyvinyl acetal resin (3) (average polymerization degree: 1700, using n-butyl aldehyde, content of hydroxyl group: 31% by mole, butyralization degree: 68% by mole, acetylation degree: 1% by mole) 100 parts by weight Plasticizer (Bis(2-butoxyethyl) adipate (D931)) 35 parts by weight An amount that is 70 ppm in the obtained interlayer film of Metal salt M (Mg mixture)

An amount that is 0.2% by weight in the obtained interlayer film of an ultraviolet ray screening agent (Tinuvin326)

An amount that is 0.2% by weight in the obtained interlayer film of an oxidation inhibitor (BHT)

Preparation of Interlayer Film and Laminated Glass:

By coextruding the composition for forming a first layer and the composition for forming a second layer and a third layer using a coextruder, an interlayer film having a structure of the second layer/the first layer/the third layer was obtained.

Laminated glass was obtained in the same manner as that in Example 1 except that the obtained interlayer film was used.

Example 10

An interlayer film and laminated glass were obtained in the same manner as that in Example 9 except that the kinds and the amounts of the ingredients were set to that shown in the following Table 6. In Example 10, the same kinds of the ultraviolet ray screening agent and the oxidation inhibitor as those used in Example 9 were blended in the same blending amounts as those in Example 9 (blending amounts in the second layer and in the third layer), and the Mg mixture of the same kind as that in Example 9 was blended in the same blending amount as that in Example 9 (blending amounts in the second layer and the third layer).

The details of the ingredients in Table 6 are as follows.

Polyvinyl acetal resin (4) (using n-butyl aldehyde, polymerization degree: 1700, content of hydroxyl group: 34.5% by mole, butyralization degree: 64.5% by mole, acetylation degree: 1% by mole)

Comparative Example 6

An interlayer film and laminated glass were obtained in the same manner as that in Example 9 except that the kinds and the amounts of the ingredients were set to that shown in the following Table 6. In Comparative Example 6, the same kinds of the ultraviolet ray screening agent and the oxidation inhibitor as those used in Example 9 were blended in the same blending amounts as those in Example 9 (blending amount in the first layer, blending amounts in the second layer and in the third layer), and the Mg mixture of the same kind as that in Example 9 was blended in the same blending amount as that in Example 9 (blending amount in the first layer, blending amounts in the second layer and the third layer).

The details of the ingredients in Table 6 are as follows.

Polyvinyl acetal resin (5) (average polymerization degree: 1700, using n-butyl aldehyde, content of hydroxyl group: 30% by mole, butyralization degree: 69% by mole, acetylation degree: 1% by mole)

Fluorene (additive): 9,9-bis [4-(2-hydroxyethoxy)phenyl] fluorene (Evaluation)

(1) Resonance Frequency and Loss Factor in Secondary Mode

The obtained interlayer film was cut into a size of 25 mm wide and 300 mm long. As the first lamination glass member, and the second lamination glass member, two glass plates (clear float glass, 25 mm wide, 300 mm long and 2 mm thick) were prepared. The interlayer film is sandwiched between the two glass plates to obtain a laminate. The laminate was put into a rubber bag and the interior of the bag was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a sheet of laminated glass. The obtained laminated glass was stored in an environment at room temperature of 23±2° C. and a humidity of 25±5%. After 1 month after completion of the autoclave, the obtained laminated glass was excited with a vibration generator for damping test ("Vibrator G21-005D" available from Shinken. Co., Ltd.) in a thermostatic oven at 20° C. The resultant vibration characteristic was amplified with a mechanical impedance measuring device ("XG-81" available from RION Co., Ltd.), and the vibration spectrum was analyzed with a FFT spectrum analyzer ("FFT analyzer HP3582A" available from Yokogawa Hewlett Packard) to measure a resonance frequency and the loss factor.

(2) Glass Transition Temperature

The obtained interlayer film was stored for 1 month in an environment at room temperature of 23±2° C. and a humidity of 25±5%. In the case of an interlayer film having a single-layered structure, the interlayer film was used as is in an environment at room temperature of 23±2° C. directly after storage. In the case of the interlayer film having a multilayer structure, the first layer that was obtained by peeling off the second layer and the third layer from the interlayer film was press molded at 150° C. so that the thickness was 0.35 mm (at 150° C. without pressurization for 10 minutes, at 150° C. under pressurization for 10 minutes) to prepare a resin film. Then the resin film was measured for viscoelasticity using "ARES-G2" available from TA Instruments. Glass transition temperature was measured under the condition in which the temperature was decreased from 100° C. to −50° C. at a temperature decreasing rate of 3° C./minute and under the condition of a frequency of 1 Hz and a strain of 1% by using a parallel plate with a diameter of 8 mm as a jig.

(3) Sound Insulating Property

The obtained interlayer film was cut into a size of 500 mm wide and 500 mm long. As the first lamination glass member, and the second lamination glass member, two glass plates (clear float glass, 500 mm wide, 500 mm long and 2 mm thick) were prepared. The interlayer film was sandwiched between the two glass plates to obtain a laminate. The laminate was put into a rubber bag and the interior of the bag was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a sheet of laminated glass. The obtained laminated glass was stored for 1 month in an environment at room temperature 23±2° C. and a humidity of 25±5%.

Sound transmission loss of the obtained laminated glass was measured by the method in accordance with JIS A 1441-1, the sound insulating property was judged according to the following criteria from sum S of values of sound transmission loss at 2500 Hz, 3150 Hz, 4000 Hz, 5000 Hz, and 6300 Hz from A to near B in FIG. 5.

[Criteria for Judgment in Sound Insulating Property]

◯: S is 210 dB or more
Δ: S is 205 dB or more and less than 210 dB
X: S is less than 205 dB The details and the results are shown in the following Tables 1 to 6. In the following Tables 1, 2, and 4 to 6, the description of ingredients to be blended other than resins, plasticizers, adhesive strength adjusting agents, and additives was omitted.

TABLE 1

| | | | Example 1 | Example 2 |
|---|---|---|---|---|
| Interlayer film | Second layer | Thickness (μm) | | 350 |
| | | Kind of cured product or resin | | Polyvinyl acetal resin (1) |
| | | Blending amount of cured product or resin (parts by weight) | | 100 |
| | | Kind of plasticizer | | 3GO |
| | | Blending amount of plasticizer (parts by weight) | | 37.5 |
| | First layer | Thickness (μm) | 800 | 100 |
| | | Kind of cured product or resin | Aliphatic polyolefin | Aliphatic polyolefin |
| | | Blending amount of cured product or resin (parts by weight) | 100 | 100 |
| | | Kind of plasticizer | Diana process oil PW-90 | Diana process oil PW-32 |
| | | Blending amount of plasticizer (parts by weight) | 40 | 35 |
| | | Kind of adhesive strength adjusting agent | ARUFON UH-2041 | — |
| | | Blending amount of adhesive strength adjusting agent (parts by weight) | 5 | — |
| | Third layer | Thickness (μm) | | 350 |
| | | Kind of cured product or resin | | Polyvinyl acetal resin (1) |
| | | Blending amount of cured product or resin (parts by weight) | | 100 |
| | | Kind of plasticizer | | 3GO |
| | | Blending amount of plasticizer (parts by weight) | | 37.5 |
| Evaluation | | Resonance frequency (Hz): X | 633 | 603 |
| | | Loss factor in secondary mode: Y | 0.412 | 0.376 |
| | | 0.0008X − 0.142 | 0.364 | 0.340 |
| | | Judgement of Y > 0.0008X − 0.143 | ◯ | ◯ |
| | | Presence or absence of glass transition temperature of first layer in temperature range of −10° C. to 10° C. | Presence | Presence |

TABLE 1-continued

|  | Example 1 | Example 2 |
|---|---|---|
| Glass transition temperature of first layer (° C.) | −3.8 | −6.7 |
| transmission loss at 3150 Hz) (dB) | 41.7 | 41.5 |
| Sound insulating property (sound transmission loss at 6300 Hz) (dB) | 45.7 | 44.2 |
| Sound insulating property (S) | ○ | ○ |

TABLE 2

| | | | Comparative Example 1 | Comparative Example 2 | Comparative Example 3 | Comparative Example 4 |
|---|---|---|---|---|---|---|
| Interlayer film | Second layer | Thickness (μm) | 350 | 350 | 350 | 350 |
| | | Kind of cured product or resin | Polyvinyl acetal resin (1) | Polyvinyl acetal resin (1) | Polyvinyl acetal resin (1) | Polyvinyl acetal resin (1) |
| | | Blending amount of cured product or resin (parts by weight) | 100 | 100 | 100 | 100 |
| | | Kind of plasticizer | 3GO | 3GO | 3GO | 3GO |
| | | Blending amount of plasticizer (parts by weight) | 31.5 | 37.5 | 37.5 | 39.5 |
| | First layer | Thickness (μm) | 100 | 100 | 100 | 100 |
| | | Kind of cured product or resin | Polyvinyl acetal resin (2) | Aliphatic polyolefin | Polyvinyl acetal resin (2) | Polyvinyl acetal resin (2) |
| | | Blending amount of cured product or resin (parts by weight) | 100 | 100 | 100 | 100 |
| | | Kind of plasticizer | 3GO | Diana process oil PW-32 | 3GO | 3GO |
| | | Blending amount of plasticizer (parts by weight) | 60 | 50 | 60 | 60 |
| | | Kind of adhesive strength adjusting agent | — | — | — | — |
| | | Blending amount of adhesive strength adjusting agent (parts by weight) | — | — | — | — |
| | Third layer | Thickness (μm) | 350 | 350 | 350 | 350 |
| | | Kind of cured product or resin | Polyvinyl acetal resin (1) | Polyvinyl acetal resin (1) | Polyvinyl acetal resin (1) | Polyvinyl acetal resin (1) |
| | | Blending amount of cured product or resin (parts by weight) | 100 | 100 | 100 | 100 |
| | | Kind of plasticizer | 3GO | 3GO | 3GO | 3GO |
| | | Blending amount of plasticizer (parts by weight) | 31.5 | 37.5 | 37.5 | 39.5 |
| Evaluation | Resonance frequency (Hz): X | | 946 | 540 | 669 | 739 |
| | Loss factor in secondary mode: Y | | 0.232 | 0.352 | 0.367 | 0.381 |
| | 0.0008X − 0.142 | | 0.615 | 0.290 | 0.393 | 0.449 |
| | Judgement of Y > 0.0008X − 0.143 | | x | ○ | x | x |
| | Presence or absence of glass transition temperature of first layer in temperature range of −10° C. to 10° C. | | Presence | Absence | Presence | Presence |
| | Glass transition temperature of first layer (° C.) | | 3.5 | −14.5 | −4.5 | −2.3 |
| | Sound insulating property (sound transmission loss at 3150 Hz) (dB) | | 38.1 | 42.3 | 41.3 | 41.2 |
| | Sound insulating property (sound transmission loss at 6300 Hz) (dB) | | 45.5 | 35.5 | 40.8 | 42.1 |
| | Sound insulating property (S) | | x | x | x | x |

TABLE 3

|  |  |  | (Meth)acryl polymer (1) | (Meth)acryl polymer (2) | (Meth)acryl polymer (3) | (Meth)acryl polymer (4) | (Meth)acryl polymer (5) | (Meth)acryl polymer (6) | (Meth)acryl polymer (7) |
|---|---|---|---|---|---|---|---|---|---|
| Ingredient | EA | Parts by weight | 40 | 21 |  |  |  |  | 35 |
|  | BzA | Parts by weight | 32 | 33 | 45 | 45 | 45 | 45 | 23 |
|  | CTFA | Parts by weight |  | 18 | 33 | 33 | 33 | 33 |  |
|  | HPA | Parts by weight | 28 | 28 | 22 | 22 | 22 | 22 |  |
|  | HEA | Parts by weight |  |  |  |  |  |  | 10 |
|  | BA | Parts by weight |  |  |  |  |  |  | 32 |
|  | IRGACURE 184 | Parts by weight | 0.2 | 0.2 | 0.2 | 0.2 | 0.2 | 0.2 | 10 |
|  | 3GO | Parts by weight | 15 | 20 |  |  |  |  | 32 |
|  | ATBC | Parts by weight |  |  | 40 | 42.5 | 45 | 47.5 |  |

The details of the components shown in Table 3 used in synthesis of (meth)acryl polymers (1) to (7) are as follows.

EA: ethyl acrylate (available from NIPPON SHOKUBAI CO., LTD.)

BzA: benzyl acrylate (available from OSAKA ORGANIC CHEMICAL INDUSTRY LTD., VISCOAT #160)

BA: butyl acrylate (available from NIPPON SHOKUBAI CO., LTD.)

HEA: 2-hydroxyethyl acrylate (available from OSAKA ORGANIC CHEMICAL INDUSTRY LTD.)

CTFA: cyclic trimethylolpropane formal acrylate (available from OSAKA ORGANIC CHEMICAL INDUSTRY LTD., VISCOAT #200)

HPA: hydroxypropyl acrylate (available from OSAKA ORGANIC CHEMICAL INDUSTRY LTD.)

IRGACURE 184: 2,2-dimethoxy-1,2-diphenylethane-1-one (available from BASF)

3GO: triethylene glycol di-2-ethylhexanoate

ATBC: acetyl tributyl citrate (available from Taoka Chemical CO., Ltd.)

TABLE 4

|  |  |  | Example 3 | Example 4 | Example 5 | Example 6 |
|---|---|---|---|---|---|---|
| Interlayer film | Second layer | Thickness (μm) | 380 | 380 | 380 | 380 |
|  |  | Kind of cured product or resin | Polyvinyl acetal resin (3) | Polyvinyl acetal resin (3) | Polyvinyl acetal resin (3) | Polyvinyl acetal resin (3) |
|  |  | Blending amount of cured product or resin (parts by weight) | 100 | 100 | 100 | 100 |
|  |  | Kind of plasticizer | 3GO | 3GO | 3GO | 3GO |
|  |  | Blending amount of plasticizer (parts by weight) | 35 | 35 | 35 | 35 |
|  | Fourth layer | Thickness (μm) | 50 | 50 | 50 | 50 |
|  |  | Kind | PET film (1) | PET film (1) | PET film (1) | PET film (1) |
|  | First layer | Thickness (μm) | 100 | 100 | 100 | 100 |
|  |  | Kind of cured product or resin | Meth(acryl) polymer (1) | Meth(acryl) polymer (2) | Meth(acryl) polymer (3) | Meth(acryl) polymer (4) |
|  |  | Blending amount of cured product or resin (parts by weight) | 100 | 100 | 100 | 100 |
|  |  | Kind of plasticizer | 3GO | 3GO | ATBC | ATBC |
|  |  | Blending amount of plasticizer (parts by weight) | 15 | 20 | 40 | 42.5 |
|  |  | Kind of adhesive strength adjusting agent | — | — | — | — |
|  |  | Blending amount of plasticizer (parts by weight) | — | — | — | — |
|  | Fifth layer | Thickness (μm) | 50 | 50 | 50 | 50 |
|  |  | Kind | PET film (1) | PET film (1) | PET film (1) | PET film (1) |
|  | Third layer | Thickness (μm) | 380 | 380 | 380 | 380 |
|  |  | Kind of cured product or resin | Polyvinyl acetal resin (3) | Polyvinyl acetal resin (3) | Polyvinyl acetal resin (3) | Polyvinyl acetal resin (3) |

TABLE 4-continued

|  |  | Example 3 | Example 4 | Example 5 | Example 6 |
|---|---|---|---|---|---|
|  | Blending amount of cured product or resin (parts by weight) | 100 | 100 | 100 | 100 |
|  | Kind of plasticizer | 3GO | 3GO | 3GO | 3GO |
|  | Blending amount of plasticizer (parts by weight) | 35 | 35 | 35 | 35 |
| Evaluation | Resonance frequency (Hz): X | 723 | 625 | 716 | 676 |
|  | Loss factor in secondary mode: Y | 0.502 | 0.436 | 0.506 | 0.487 |
|  | 0.0008X − 0.142 | 0.436 | 0.358 | 0.431 | 0.399 |
|  | Judgement of Y > 0.0008X − 0.143 | ○ | ○ | ○ | ○ |
|  | Presence or absence of glass transition temperature of first layer in temperature range of −10° C. to 10° C. | Presence | Presence | Presence | Presence |
|  | Glass transition temperature of first layer (° C.) | −6.6 | −8.4 | −5.3 | −6.5 |
|  | Sound insulating property (S) | ○ | ○ | ○ | ○ |

TABLE 5

|  |  |  | Example 7 | Example 8 | Comparative Example 5 |
|---|---|---|---|---|---|
| Interlayer film | second layer | Thickness (μm) | 380 | 380 | 380 |
|  |  | Kind of cured product or resin | Polyvinyl acetal resin (3) | Polyvinyl acetal resin (3) | Polyvinyl acetal resin (3) |
|  |  | Blending amount of cured product or resin (parts by weight) | 100 | 100 | 100 |
|  |  | Kind of plasticizer | 3GO | 3GO | 3GO |
|  |  | Blending amount of plasticizer (parts by weight) | 35 | 35 | 35 |
|  | Fourth layer | Thickness (μm) | 50 | 50 | 50 |
|  |  | Kind | PET film (1) | PET film (1) | PET film (1) |
|  | First layer | Thickness (μm) | 100 | 100 | 100 |
|  |  | Kind of cured product or resin | Meth (acryl) polymer (5) | Meth (acryl) polymer (6) | Meth (acryl) polymer (7) |
|  |  | Blending amount of cured product or resin (parts by weight) | 100 | 100 | 100 |
|  |  | Kind of plasticizer | ATBC | ATBC | — |
|  |  | Blending amount of plasticizer (parts by weight) | 45 | 47.5 | — |
|  |  | Kind of adhesive strength adjusting agent | — | — | — |
|  |  | Blending amount of adhesive strength adjusting agent (parts by weight) | — | — | — |
|  | Fifth layer | Thickness (μm) | 50 | 50 | 50 |
|  |  | Kind | PET film (1) | PET film (1) | PET film (1) |
|  | Third layer | Thickness (μm) | 380 | 380 | 380 |
|  |  | Kind of cured product or resin | Polyvinyl acetal resin (3) | Polyvinyl acetal resin (3) | Polyvinyl acetal resin (3) |
|  |  | Blending amount of cured product or resin (parts by weight) | 100 | 100 | 100 |
|  |  | Kind of plasticizer | 3GO | 3GO | 3GO |
|  |  | Blending amount of plasticizer (parts by weight) | 35 | 35 | 35 |
| Evaluation |  | Resonance frequency (Hz): X | 649 | 612 | 760 |
|  |  | Loss factor in secondary mode: Y | 0.465 | 0.428 | 0.412 |
|  |  | 0.0008X − 0.142 | 0.377 | 0.348 | 0.466 |
|  |  | Judgement of Y > 0.0008X − 0.143 | ○ | ○ | x |
|  |  | Presence or absence of glass transition temperature of first layer in temperature range of −10° C. to 10° C. | Presence | Presence | Presence |
|  |  | Glass transition temperature of first layer (° C.) | −7.7 | −8.9 | −7.7 |
|  |  | Sound insulating property (S) | ○ | ○ | x |

TABLE 6

|  |  |  | Example 9 | Example 10 | Comparative Example 6 |
|---|---|---|---|---|---|
| Interlayer film | second layer | Thickness (μm) | 380 | 380 | 380 |
|  |  | Kind of cured product or resin | Polyvinyl acetal resin (3) | Polyvinyl acetal resin (4) | Polyvinyl acetal resin (5) |
|  |  | Blending amount of cured product or resin (parts by weight) | 100 | 100 | 100 |
|  |  | Kind of plasticizer | D931 | D931 | 3GO |
|  |  | Blending amount of plasticizer (parts by weight) | 35 | 33 | 36 |
|  | First layer | Thickness (μm) | 100 | 100 | 150 |
|  |  | Kind of cured product or resin | Vinyl acetate (1) | Vinyl acetate (1) | Vinyl acetate (2) |
|  |  | Blending amount of cured product or resin (parts by weight) | 100 | 100 | 100 |
|  |  | Kind of plasticizer | D931 | D931 | 3GO |
|  |  | Blending amount of plasticizer (parts by weight) | 80 | 70 | 60 |
|  |  | Kind of additive | — | — | Fluorene |
|  |  | Blending amount of additive (parts by weight) | — | — | 100 |
|  | Third layer | Thickness (μm) | 380 | 380 | 380 |
|  |  | Kind of cured product or resin | Polyvinyl acetal resin (3) | Polyvinyl acetal resin (4) | Polyvinyl acetal resin (5) |
|  |  | Blending amount of cured product or resin (parts by weight) | 100 | 100 | 100 |
|  |  | Kind of plasticizer | D931 | D931 | 3GO |
|  |  | Blending amount of plasticizer (parts by weight) | 35 | 33 | 36 |
| Evaluation |  | Resonance frequency (Hz): X | 689 | 643 | 1010 |
|  |  | Loss factor in secondary mode: Y | 0.423 | 0.425 | 0.100 |
|  |  | 0.0008X − 0.142 | 0.409 | 0.372 | 0.666 |
|  |  | Judgement of Y > 0.0008X − 0.143 | ○ | ○ | x |
|  |  | Presence or absence of glass transition temperature of first layer in temperature range of −10° C. to 10° C. | Presence | Presence | Presence |
|  |  | Glass transition temperature of first layer (° C.) | 0 | −4.5 | 22 |
|  |  | Sound insulating property (S) | Δ | ○ | x |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (first layer)
11a: First surface
11b: Second surface
21: First lamination glass member
22: Second lamination glass member
31: Laminated glass
31A: Laminated glass

The invention claimed is:

1. An interlayer film for laminated glass having a three or more-layer structure,
the interlayer film including a first layer; a second layer arranged on a first surface side of the first layer; and a third layer arranged on a second surface side opposite to the first surface side of the first layer,
the first layer containing a (meth)acryl polymer and a plasticizer, the second layer containing a thermoplastic resin and a plasticizer, and the third layer containing a thermoplastic resin and a plasticizer,
the interlayer film having a resonance frequency X of 550 Hz or more and 740 Hz or less, a loss factor Y in a secondary mode of 0.35 or more, and satisfying a formula: Y>0.0008X−0.142 in a measurement of resonance frequency in a secondary mode in a damping test for laminated glass according to a central exciting method of laminated glass, when the laminated glass is obtained by arranging the interlayer film between two glass plates of 25 mm wide, 300 mm long and 2 mm thick, and
provided that an overall thickness of the interlayer film for laminated glass is T, the first layer having a thickness of 0.25T or less and,
the plasticizer of the first layer being in a content of 15 parts by weight or more and 60 parts by weight or less relative to 100 parts by weight of the (meth)acryl polymer in the first layer.

2. The interlayer film for laminated glass according to claim 1, wherein the plasticizer in the first layer is a plasticizer other than an organic ester plasticizer.

3. The interlayer film for laminated glass according to claim 1, wherein the plasticizer in the first layer is paraffin oil.

4. The interlayer film for laminated glass according to claim 1, which is used for obtaining laminated glass by being arranged between a first glass plate having a thickness of 1.8 mm or more and 3 mm or less, and a second glass plate.

5. The interlayer film for laminated glass according to claim 1, wherein
   the interlayer film is used for obtaining laminated glass by being arranged between a first glass plate and a second glass plate, and
   a total of a thickness of the first glass plate and a thickness of the second glass plate is 3.6 mm or more and 6 mm or less.

6. The interlayer film for laminated glass according to claim 1, wherein an outer surface of the interlayer film has protrusions and recesses formed thereon.

7. The interlayer film for laminated glass according to claim 1, wherein the first layer comprises a coupling agent, the second layer further comprises a surfactant, and the third layer further comprises a flame retardant and an antistatic agent.

8. A laminated glass comprising:
   a first lamination glass member;
   a second lamination glass member; and
   the interlayer film for laminated glass according to claim 1,
   the interlayer film for laminated glass being arranged between the first lamination glass member and the second lamination glass member.

* * * * *